(12) United States Patent
Honda

(10) Patent No.: US 11,488,280 B2
(45) Date of Patent: Nov. 1, 2022

(54) COMPUTER-READABLE RECORDING MEDIUM RECORDING APPEARANCE FREQUENCY CALCULATION PROGRAM, INFORMATION PROCESSING APPARATUS, AND APPEARANCE FREQUENCY CALCULATION METHOD

(71) Applicant: FUJITSU LIMITED, Kawasaki (JP)

(72) Inventor: Takumi Honda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/200,948

(22) Filed: Mar. 15, 2021

(65) Prior Publication Data

US 2021/0383499 A1 Dec. 9, 2021

(30) Foreign Application Priority Data

Jun. 5, 2020 (JP) .............................. JP2020-098766

(51) Int. Cl.
 *G06T 1/20* (2006.01)
 *G06T 1/60* (2006.01)
 *G06F 9/30* (2018.01)

(52) U.S. Cl.
 CPC .............. *G06T 1/20* (2013.01); *G06F 9/3001* (2013.01); *G06F 9/3004* (2013.01); *G06F 9/30021* (2013.01); *G06T 1/60* (2013.01)

(58) Field of Classification Search
 CPC ........ G06N 20/00; G06N 5/045; G06N 10/00; G06N 3/0445; G06N 3/0472; G06N 3/063; G06N 5/003; G06N 7/005; G06T 1/20; G06T 1/60; G06F 9/30021; G06F 9/3004; G06F 9/3001; G06F 9/52
 See application file for complete search history.

(56) References Cited

U.S. PATENT DOCUMENTS

| | | |
|---|---|---|
| 2014/0149719 A1 | 5/2014 | Tabaru |
| 2017/0097825 A1* | 4/2017 | Lo .......................... G06F 9/3009 |
| 2017/0206458 A1* | 7/2017 | Sakamoto ........... H04L 63/1425 |

(Continued)

FOREIGN PATENT DOCUMENTS

| | | |
|---|---|---|
| JP | 2014-106715 A | 6/2014 |
| JP | 2016-527650 A | 9/2016 |

(Continued)

*Primary Examiner* — Abderrahim Merouan
(74) *Attorney, Agent, or Firm* — Fujitsu Patent Center

(57) ABSTRACT

A recording medium recording an appearance frequency calculation program for causing an information processing apparatus to execute processing includes: construction processing of constructing thread groups each including threads; acquisition processing in which the thread group acquires a data group including a same number of pieces of data as a number of threads constituting the thread group, each thread being responsible for one piece of data of the data group; and addition processing in which the thread adds one to a first storage area that stores an appearance frequency of a first numerical value, and a duplication number indicating a number of duplication is added to the first storage area when the own thread is a representative thread that is present alone in the thread group that is responsible for the data of the first numerical value when the first numerical value is duplicated in the data group.

18 Claims, 16 Drawing Sheets

(56) References Cited

U.S. PATENT DOCUMENTS

| | | | | |
|---|---|---|---|---|
| 2017/0208080 A1* | 7/2017 | Sakamoto | .............. | G06N 20/00 |
| 2020/0201932 A1* | 6/2020 | Gradstein | ............ | G06F 9/30036 |
| 2021/0383499 A1* | 12/2021 | Honda | ....................... | G06T 1/60 |

FOREIGN PATENT DOCUMENTS

| | | |
|---|---|---|
| JP | 2019-212171 A | 12/2019 |
| WO | 2015/021151 A1 | 2/2015 |
| WO | 2019/235636 A1 | 12/2019 |

* cited by examiner

INPUT DATA

200

| 0 | 3 | 1 | 2 | 0 | 0 | 1 | 1 |
|---|---|---|---|---|---|---|---|
| 0 | 2 | 2 | 3 | 1 | 1 | 1 | 1 |
| 1 | 0 | 3 | 1 | 2 | 2 | 3 | 1 |
| 1 | 1 | 2 | 2 | 0 | 2 | 2 | 0 |
| 0 | 1 | 2 | 0 | 0 | 0 | 0 | 0 |
| 1 | 1 | 0 | 0 | 0 | 0 | 0 | 0 |
| 2 | 1 | 1 | 0 | 0 | 0 | 0 | 1 |
| 3 | 2 | 1 | 1 | 1 | 0 | 0 | 1 |

APPEARANCE FREQUENCY

| 0 | 1 | 2 | 3 |
|---|---|---|---|
| 25 | 22 | 12 | 5 |

US 11,488,280 B2

COMPUTER-READABLE RECORDING MEDIUM RECORDING APPEARANCE FREQUENCY CALCULATION PROGRAM, INFORMATION PROCESSING APPARATUS, AND APPEARANCE FREQUENCY CALCULATION METHOD

CROSS-REFERENCE TO RELATED APPLICATION

This application is based upon and claims the benefit of priority of the prior Japanese Patent Application No. 2020-98766, filed on Jun. 5, 2020, the entire contents of which are incorporated herein by reference.

FIELD

The embodiments discussed herein are related to a computer-readable recording medium, a graphics processing unit, an information processing apparatus, and an appearance frequency calculation method.

BACKGROUND

The graphics processing unit (GPU) is an accelerator or a processor for performing image processing and data compression processing. The GPU includes, for example, a large number of arithmetic units and functions.

Techniques related to the GPU are described in Japanese National Publication of International Patent Application No. 2016-527650, Japanese Laid-open Patent Publication No. 2019-212171, and Japanese Laid-open Patent Publication No. 2014-106715.

SUMMARY

According to an aspect of the embodiments, a non-transitory computer-readable recording medium having stored therein an appearance frequency calculation program for causing a graphics processing unit included in an information processing apparatus to execute processing includes: construction processing of constructing one or more thread groups each constituted of a plurality of threads; acquisition processing in which the thread group acquires, from input data, a data group including a same number of pieces of data as a number of threads constituting the thread group, each of the plurality of threads of the thread group being responsible for one piece of data of the data group; and addition processing in which the thread adds one to a first storage area that stores an appearance frequency of a first numerical value when the first numerical value of data for which the own thread is responsible is not duplicated in the data group, and a duplication number indicating a number of duplication is added to the first storage area when the own thread is a representative thread that is present alone in the thread group that is responsible for the data of the first numerical value in a case where the first numerical value is duplicated in the data group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of input data and an appearance frequency;

DESCRIPTION OF EMBODIMENTS

For example, in the image processing, the GPU may divide a value of input data into certain sections, calculate an appearance frequency of each piece of data in each section, and generate a histogram. The histogram indicates characteristics of the input data, and is used, for example, for image flattening, contrast emphasis, or the like.

However, the GPU executes a plurality of kinds of atomic processing in the calculation of the appearance frequency. The atomic processing is, for example, indivisible processing that does not allow an interrupt of another thread in order to avoid simultaneous access to the same memory. When executing the atomic processing, the GPU puts threads other than the thread that executes the atomic processing, in a waiting state. For example, by executing the atomic processing, a waiting time occurs in a plurality of threads, and a delay occurs in the processing.

One disclosure provides an appearance frequency calculation program, a graphics processing unit, an information processing apparatus, and an appearance frequency calculation method which suppress the number of times of execution of the atomic processing in the calculation of an appearance frequency.

First Embodiment

A first embodiment will be described.

Configuration Example of Information Processing System 10

Figure 1:
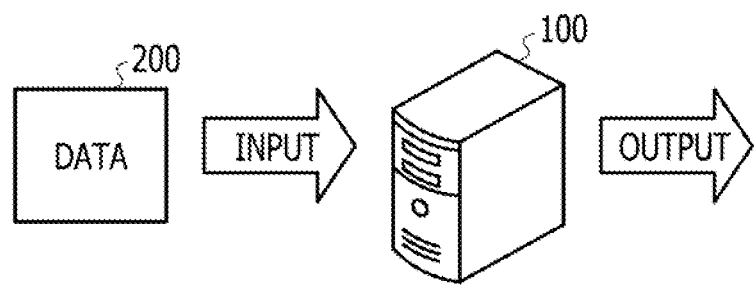
FIG. 1 illustrates a configuration example of an information processing system.

FIG. 1 illustrates a configuration example of the information processing system 10. The information processing system 10 has an information processing apparatus 100 and input data 200. The information processing system 10 is a system in which the input data 200 is input to the information processing apparatus 100, the information processing apparatus 100 processes the input data 200, and the information processing apparatus 100 outputs a processing result.

A case where the input data 200 is image data will be described below. The information processing apparatus 100 receives the input data 200 from, for example, a user or an application program (S10).

The information processing apparatus 100 calculates an appearance frequency of each of values included in the input data 200, and generates a histogram. The appearance frequency indicates the number of times (the number of pieces) each value (numerical value) in the input data appears. The information processing apparatus 100 performs image flattening, contrast emphasis, and the like based on the generated histogram. The information processing apparatus 100 performs data encoding or the like as image analysis processing.

When the input data 200 is converted into an output format (for example, image), the information processing apparatus 100 outputs the converted image to, for example, a display unit such as a display included in the information processing apparatus 100 (S11), and causes the display unit to display the converted image.

Configuration Example of Information Processing Apparatus 100

Figure 2:
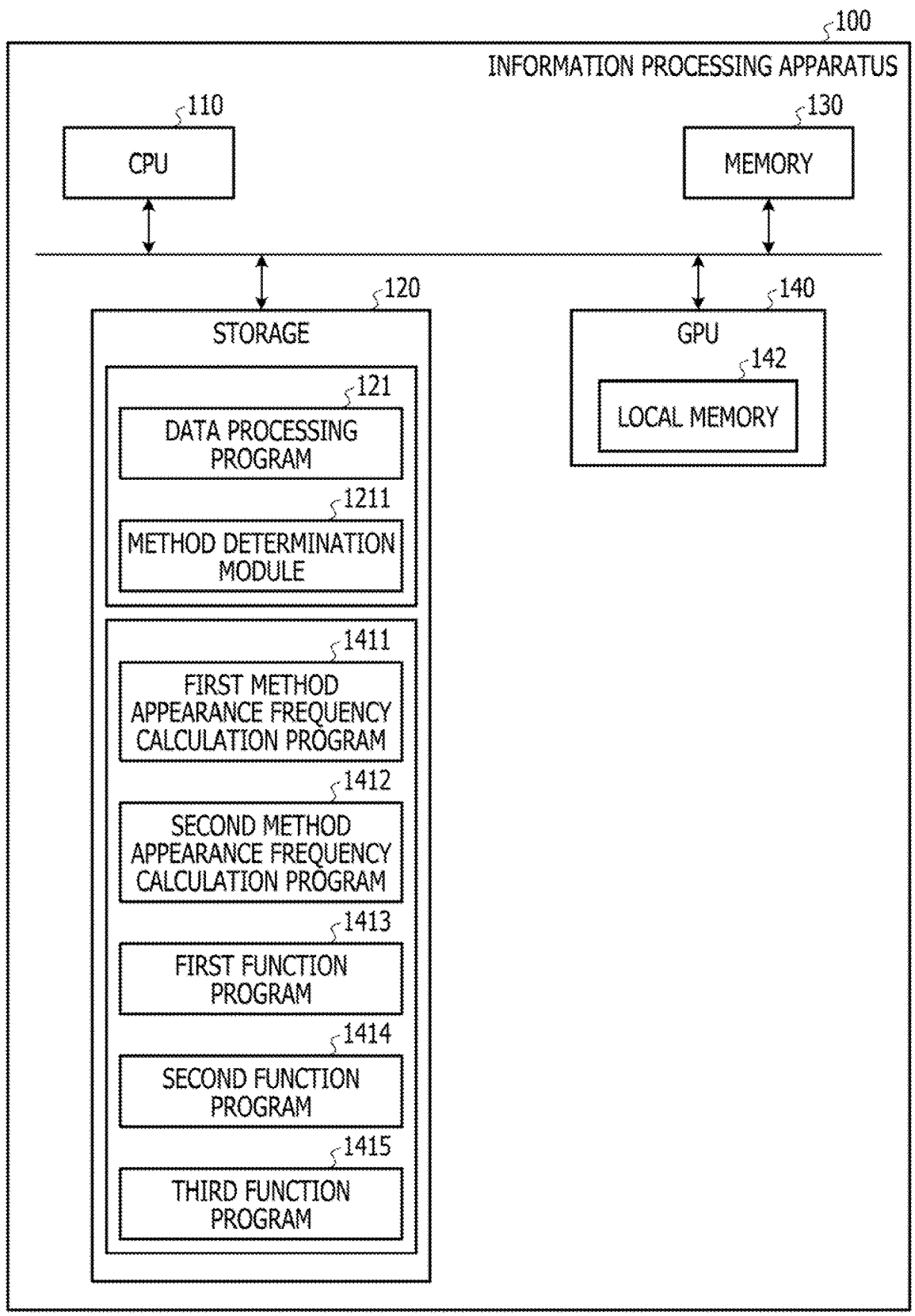
FIG. 2 illustrates a configuration example of an information processing apparatus.

FIG. 2 illustrates a configuration example of the information processing apparatus 100. The information processing apparatus 100 has a central processing unit (CPU) 110, a storage 120, a memory 130, and a GPU 140.

The storage 120 is an auxiliary storage device, such as a flash memory, a hard disk drive (HDD), or a solid-state drive (SSD), for storing programs and data. The storage 120 stores a data processing program 121. The storage 120 stores a first method appearance frequency calculation program 1411, a second method appearance frequency calculation program 1412, a first function program 1413, a second function program 1414, and a third function program 1415 which are executed by the GPU 140.

The memory 130 is an area in which a program stored in the storage 120 is loaded. The memory 130 may be used as an area in which a program stores data.

The CPU 110 is a processor that loads a program stored in the storage 120 into the memory 130, and executes the loaded program to construct each unit and to realize each processing.

By executing the data processing program 121, the CPU 110 constructs a determination unit and performs data processing. The data processing is processing of executing data analysis processing, data imaging processing, and the like on the input data and of outputting a processing result. The CPU 110 causes the GPU 140 to execute partial processing in the data processing. In a case where the CPU 110 causes the GPU 140 to execute the appearance frequency calculation processing on the input data in the data processing, the CPU 110 performs method determination processing of determining a method for the appearance frequency calculation processing.

By executing a method determination module 1211 included in the data processing program 121, the CPU 110 constructs the determination unit and performs the method determination processing. The method determination processing is processing of determining a method for the appearance frequency calculation processing to be executed by the GPU 140.

The GPU 140 has a local memory 142, and is, for example, a processor or an accelerator that loads a program stored in the storage 120 into the local memory 142 and executes the loaded program to construct each unit and to realize each processing.

The local memory 142 is an area in which a program stored in the storage 120 is loaded. The local memory 142 is used as an area in which the GPU 140 (program) stores data.

By executing the first method appearance frequency calculation program 1411, the GPU 140 constructs a construction unit, an acquisition unit, and an addition unit, and performs first method appearance frequency calculation processing. The first method appearance frequency calculation processing is processing of dividing the input data into a plurality of data groups, calculating an appearance frequency for each of the divided data groups, and adding the calculated frequencies of the respective data groups to calculate the appearance frequency of the entire input data.

By executing the second method appearance frequency calculation program 1412, the GPU 140 constructs a construction unit, an acquisition unit, and an addition unit, and performs second method appearance frequency calculation processing. The second method appearance frequency calculation processing is processing of dividing the input data into a plurality of data groups, calculating an appearance frequency for each of the divided data groups, and adding the calculated frequencies of the respective data groups to calculate the appearance frequency of the entire input data. The number of times that the atomic processing is executed in the second method appearance frequency calculation processing is equal to or smaller than the number of times that the atomic processing is executed in the first method appearance frequency calculation processing. The details of the first method appearance frequency calculation processing and the second method appearance frequency calculation processing will be described later.

By executing the first function program 1413, the GPU 140 constructs an addition unit and performs first function processing. The first function processing is processing of executing a first function. The first function processing is executed in the second method appearance frequency calculation processing.

By executing the second function program 1414, the GPU 140 constructs an addition unit and performs second function processing. The second function processing is processing of executing a second function. The second function processing is executed in the second method appearance frequency calculation processing.

By executing the third function program 1415, the GPU 140 constructs an addition unit and performs third function processing. The third function processing is processing of executing a third function. The third function processing is executed in the second method appearance frequency calculation processing.

In FIG. 2, the data processing program 121 is stored in the storage 120 and is executed by the CPU 110, but may be executed by the GPU 140.

The processing executed by the program stored in the storage 120 may be realized by, for example, hardware such as an arithmetic unit or a circuit. Each of the first function processing, the second function processing, and the third function processing may be realized by, for example, a dedicated arithmetic unit.

Appearance Frequency Calculation Processing

In the data processing, the information processing apparatus 100 may perform the appearance frequency calculation processing of calculating the appearance frequency.

FIG. 3 illustrates an example of the input data and the appearance frequency. The input data is constituted of of four kinds of numerical values (elements) of "0", "1", "2", and "3". The appearance frequency indicates the number of times each value appears in the input data (the number of pieces of each value existing in the input data). The appearance frequencies are 25 for "0", 22 for "1", 12 for "2", and 5 for "3". The information processing apparatus 100 generates the histogram based on the calculated appearance frequency, and performs the image processing. The first method appearance frequency calculation processing and the second method appearance frequency calculation processing will be described below with reference to the example of FIG. 3.

Figure 4:
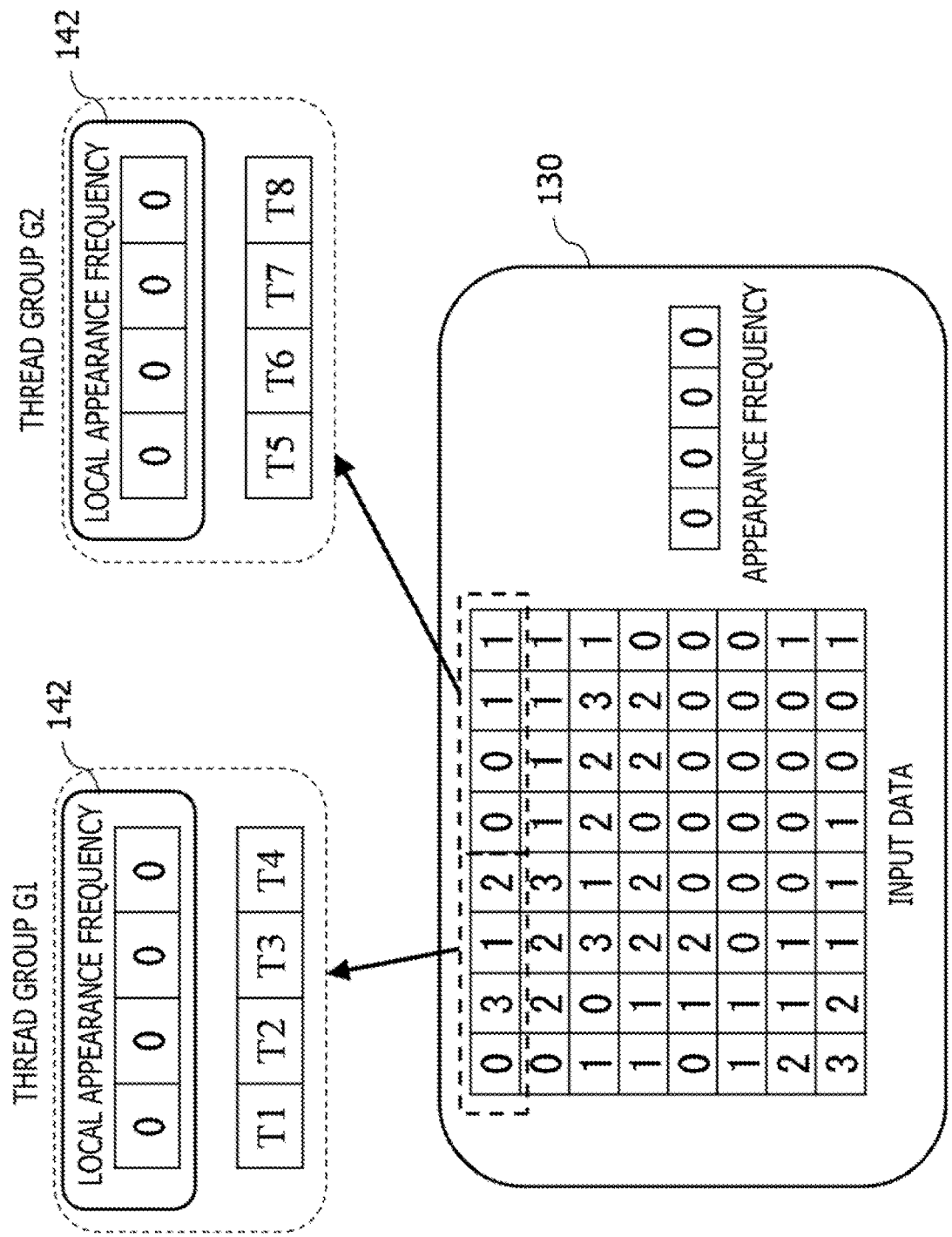
FIG. 4 illustrates an example of an appearance frequency calculation processing.

FIG. 4 illustrates an example of the appearance frequency calculation processing. In the first method appearance frequency calculation processing and the second method appearance frequency calculation processing, the GPU 140 associates input data with each of a plurality of thread groups. The GPU 140 may construct the thread as the pre-processing for performing the first method appearance frequency calculation processing or the second method appearance frequency calculation processing, or may construct the thread at all times. In FIG. 4, the thread groups are two groups of a thread group G1 and a thread group G2. The thread group G1 is constituted of four threads T1 to T4, and the thread group G2 is constituted of four threads T5 to T8. The thread group G1 calculates appearance frequencies up to the last row of upper (left side) four columns of the input data, and the thread group G2 calculates appearance frequencies up to the last row of lower (right side) four columns of the input data.

The thread group G1 acquires data (for example, "0 3 1 2") in the upper four columns of the uppermost row. The thread T1, the thread T2, the thread T3, and the thread T4 respectively set the data of the uppermost column, the data of the upper second column, the data of the upper third column, and the data of the upper fourth column as responsible data, and respectively perform processing on the responsible data. For example, the responsible data of the thread T1 is "0", the responsible data of the thread T2 is "3", the responsible data of the thread T3 is "1", and the responsible data of the thread T4 is "2".

The thread group G1 processes the data for each column (calculates or adds the appearance frequency) by the threads T1 to T4. The thread group G1 stores (adds) the appearance frequency (may be referred to as a local appearance frequency) of the data for which the own group is responsible, in a storage area of the local appearance frequency on the local memory 142 included in the GPU 140, for each row. The thread group G1 calculates the appearance frequency up to the last row. The thread group G2 also performs the same processing. Hereinafter, the appearance frequency of the data for which each thread group is responsible may be referred to as the local appearance frequency.

Each of the thread groups G1 and G2 adds the local appearance frequency to the appearance frequency area on the memory 130 when the calculation of the local appearance frequency of the data for which the own group is responsible is completed (the data for which the own group is responsible is ended).

<First Method Appearance Frequency Calculation Processing>

Figure 5:
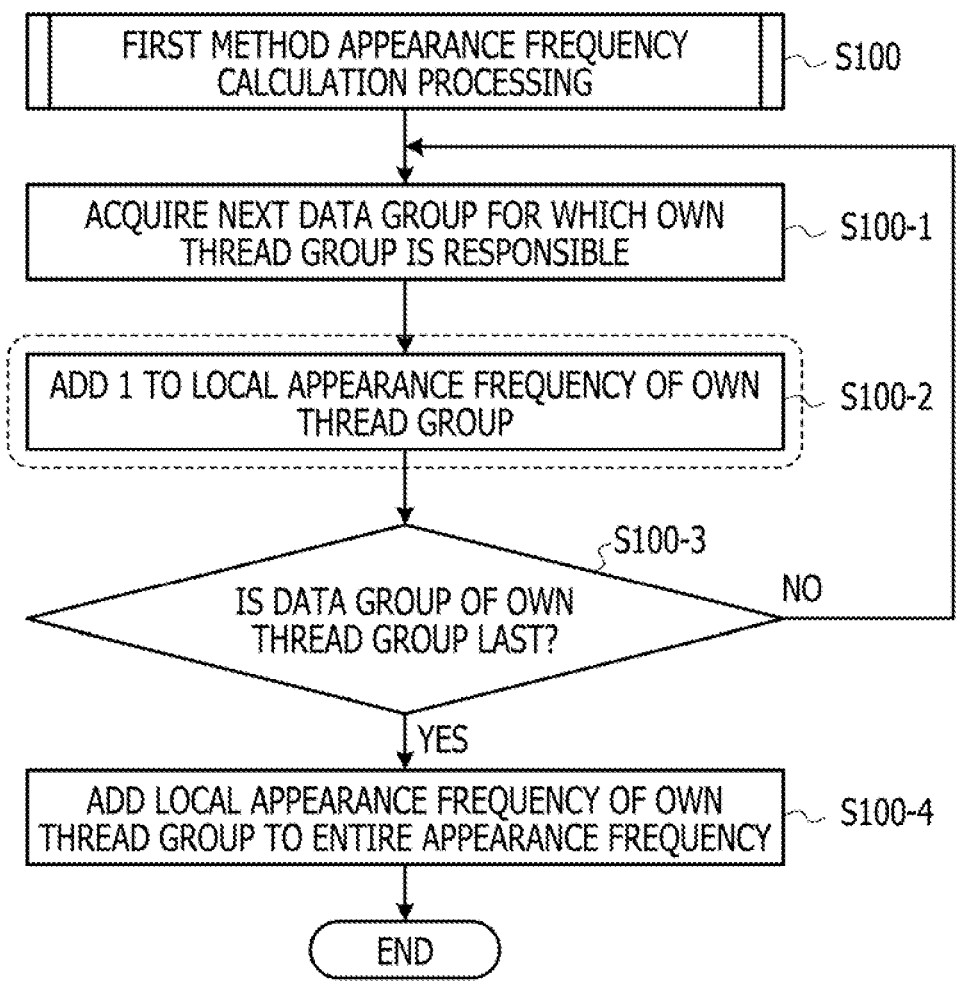
FIG. 5 illustrates an example of a processing flowchart of a first method appearance frequency calculation processing.

FIG. 5 illustrates an example of a processing flowchart of the first method appearance frequency calculation processing. For example, the GPU 140 executes first method appearance frequency calculation processing S100, in accordance with an instruction from the CPU 110. The processing flowchart of the first method appearance frequency calculation processing S100 is, for example, a processing flowchart of processing executed by each thread group. In FIG. 5, the processing surrounded by a dotted line is processing executed by each thread in the thread group.

The thread group acquires the next data group for which the own thread group is responsible (S100-1). The next data group indicates, for example, the data of the next row of the column of the responsible data. In the processing S100-1 of the first method appearance frequency calculation processing S100, the thread group acquires a responsible data group sequentially from the first row.

Each thread recognizes a numerical value of the data for which the own thread is responsible, and adds 1 to the area of the responsible numerical value in the storage area of the local appearance frequency of the own thread group (S100-2). All the threads execute the processing S100-2.

Figure 6A:
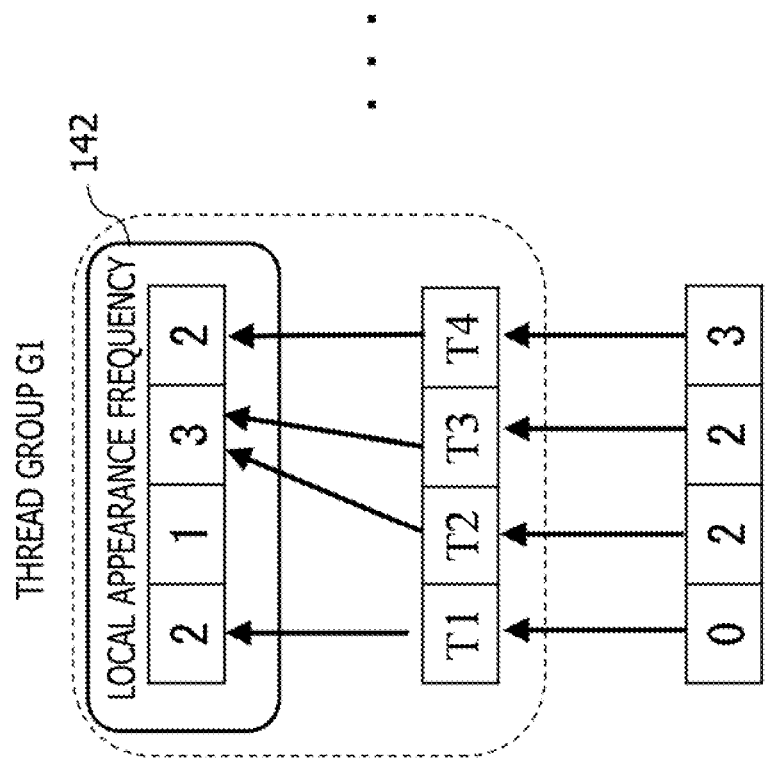
FIGS. 6A and 6B illustrate examples of processing S100-1 and processing S100-2.
Figure 6B:
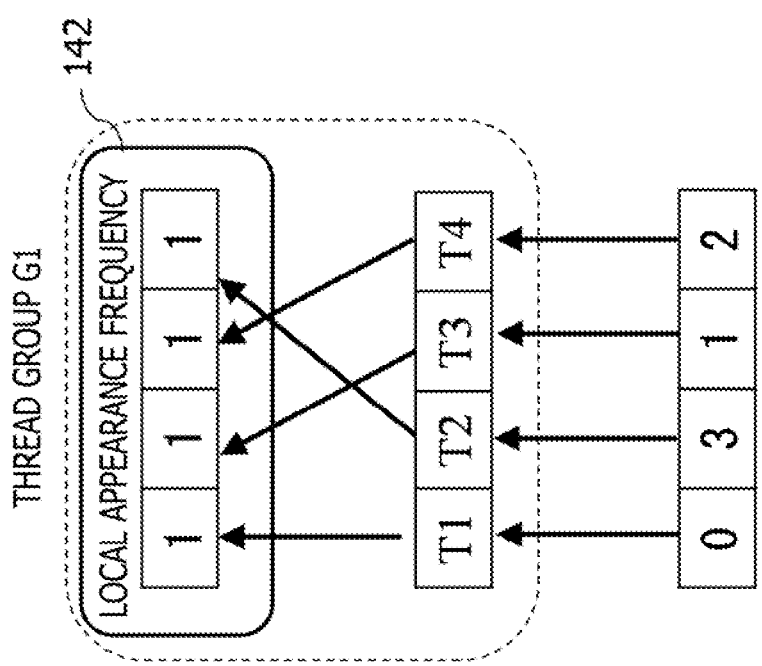

FIGS. 6A and 6B illustrate examples of the processing S1004 and the processing S100-2. FIG. 6A illustrates an example of processing for the data group in the first row, and FIG. 6B illustrates an example of processing for the data group in the second row. In FIGS. 6A and 6B, it is assumed that the storage areas for the local appearance frequencies correspond to "0", "1", "2", and "3", respectively, from the left. The processing of the thread group G1 will be described below.

As illustrated in FIG. 6A, the thread group G1 acquires the first data group "0 3 1 2". The thread T1 recognizes that the numerical value of the data for which the own thread is responsible is "0", and adds 1 to a place (the uppermost (leftmost) place of the storage area of the local appearance frequency of the thread group G1) corresponding to the numerical value "0" of the storage area of the local appearance frequency.

Similarly, the thread T2, the thread T3, and the thread T4 add 1 to the corresponding places for "3", "1", and "2", respectively. The processing for the data group in the first row is ended.

As illustrated in FIG. 6B, the thread group G1 acquires the data "0 2 2 3" in the second row. The thread T1 recognizes that the numerical value of the data for which the own thread is responsible is "0", and adds 1 to the place corresponding to the numerical value "0" of the storage area of the local appearance frequency so that the value becomes 2.

Similarly, the thread T2, the thread T3, and the thread T4 add 1 to the corresponding places for "2", "2", and "3", respectively. As a result, the local appearance frequencies are stored as 2 for "0", 1 for "1", 3 for "2", and 2 for "3".

Referring back to the processing flowchart of FIG. 5, the thread group checks whether or not the responsible data group of the own thread group is the last data group (S100-3). In a case where the data group is the last data group (in a case where there is no more data) (Yes in S100-3), the thread group adds the local appearance frequency of the own thread group to the entire appearance frequency (appearance frequency area of the memory 130), and ends the processing (S100-4).

Figure 7:
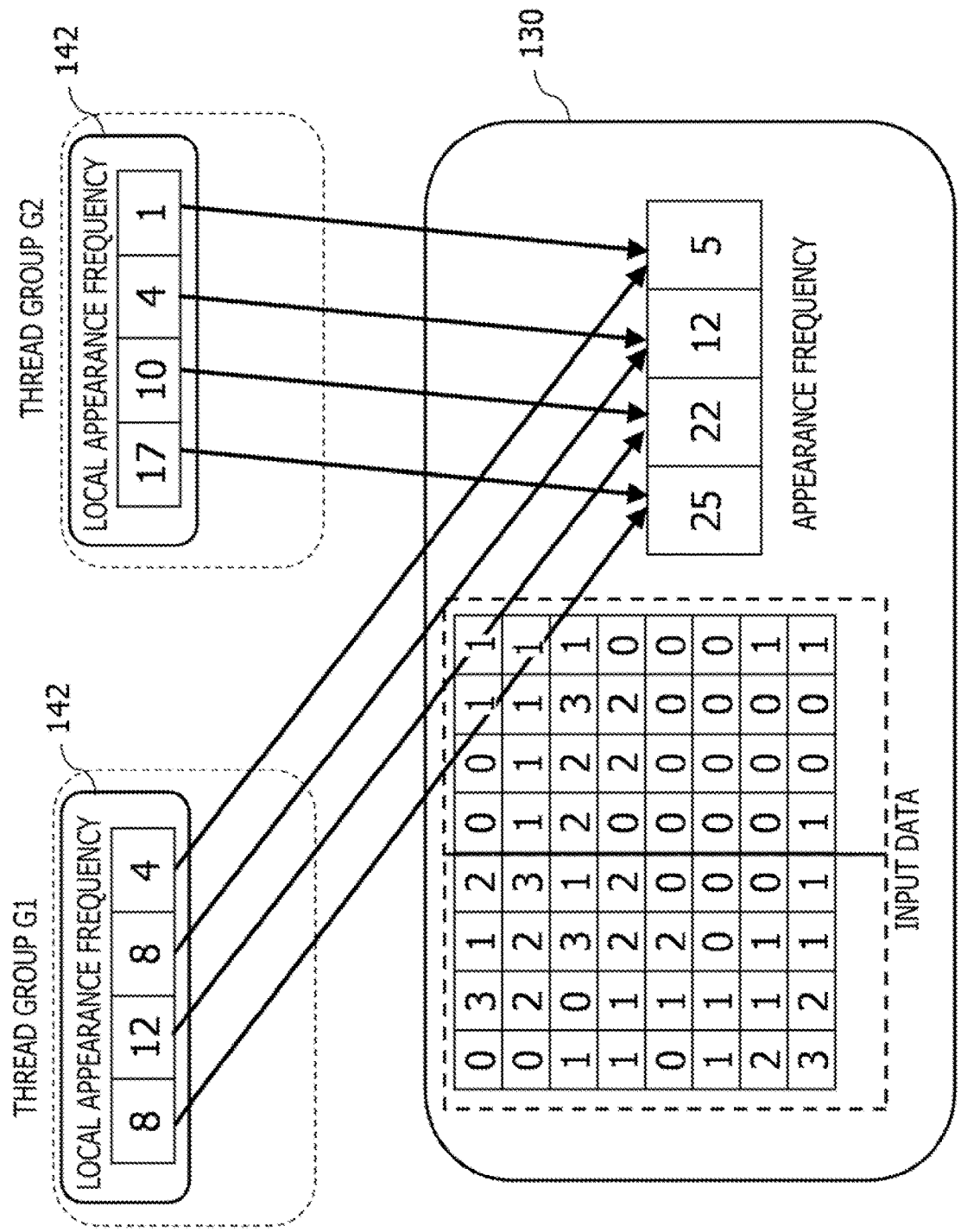
FIG. 7 illustrates an example of processing S100-4.

FIG. 7 illustrates an example of the processing S100-4. Each of the thread groups G1 and G2 calculates the local appearance frequency of the responsible data of the own thread group by repeating the processing illustrated in FIGS. 6A and 6B. Each of the thread groups G1 and G2 adds the local appearance frequency to the storage area of the appearance frequency on the memory 130. The appearance frequency (may be referred to as a total appearance frequency) of the input data is calculated.

Referring back to the processing flowchart of FIG. 5, in a case where the responsible data group of the own thread group is not the last data group (No in S100-3), the thread group repeats the processing S100-1 to the processing S100-3 until there is no more responsible data.

The processing in which each thread adds the local appearance frequency in FIGS. 6A and 6B and the processing in which each thread group adds the local appearance frequency to the appearance frequency of the memory 130 in FIG. 7 are the atomic processing. For example, in FIG. 6B, since the thread T2 and the thread T3 add 1 to the same area, a write waiting time occurs in at least one thread.

In a case where the thread group executes the processing, any thread in the thread group may execute the processing, or another thread (not illustrated) may be activated as the thread that executes the processing of the thread group and the corresponding thread may execute the processing.

<Second Method Appearance Frequency Calculation Processing>

Figure 8:
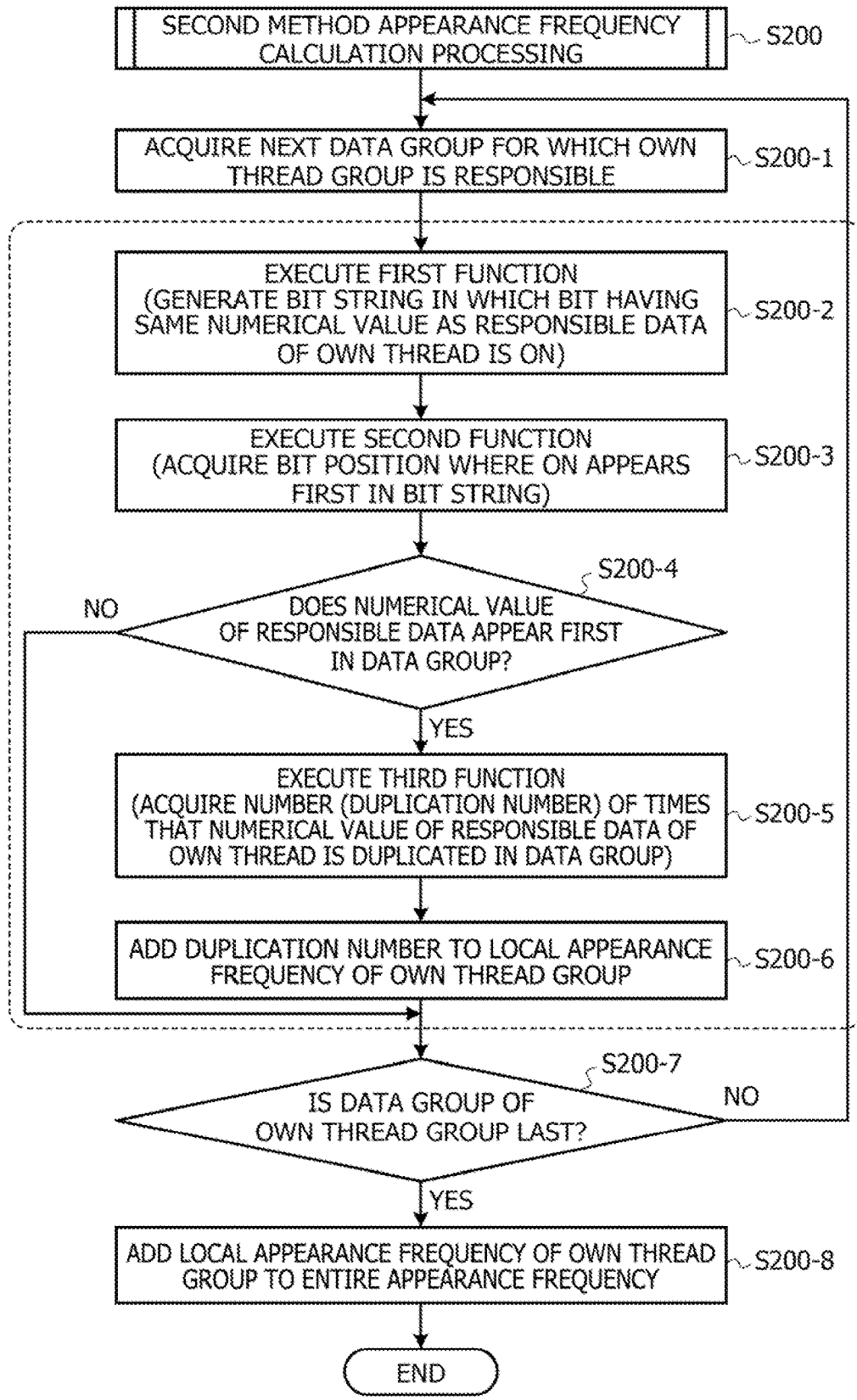
FIG. 8 illustrates an example of a processing flowchart of a second method appearance frequency calculation processing.

FIG. 8 illustrates an example of a processing flowchart of the second method appearance frequency calculation processing. For example, the GPU 140 executes second method appearance frequency calculation processing S200, in accordance with an instruction from the CPU 110. The processing flowchart of the second method appearance frequency calculation processing S200 is, for example, a processing flowchart of processing executed by each thread group. In FIG. 8, the processing surrounded by a dotted line is processing executed by each thread.

The thread group acquires the next data group for which the own thread group is responsible (S200-1).

Each thread executes the first function to generate a bit string in which a bit having the same numerical value as the responsible data of the own thread is 1 (ON) (S200-2).

Figure 9:
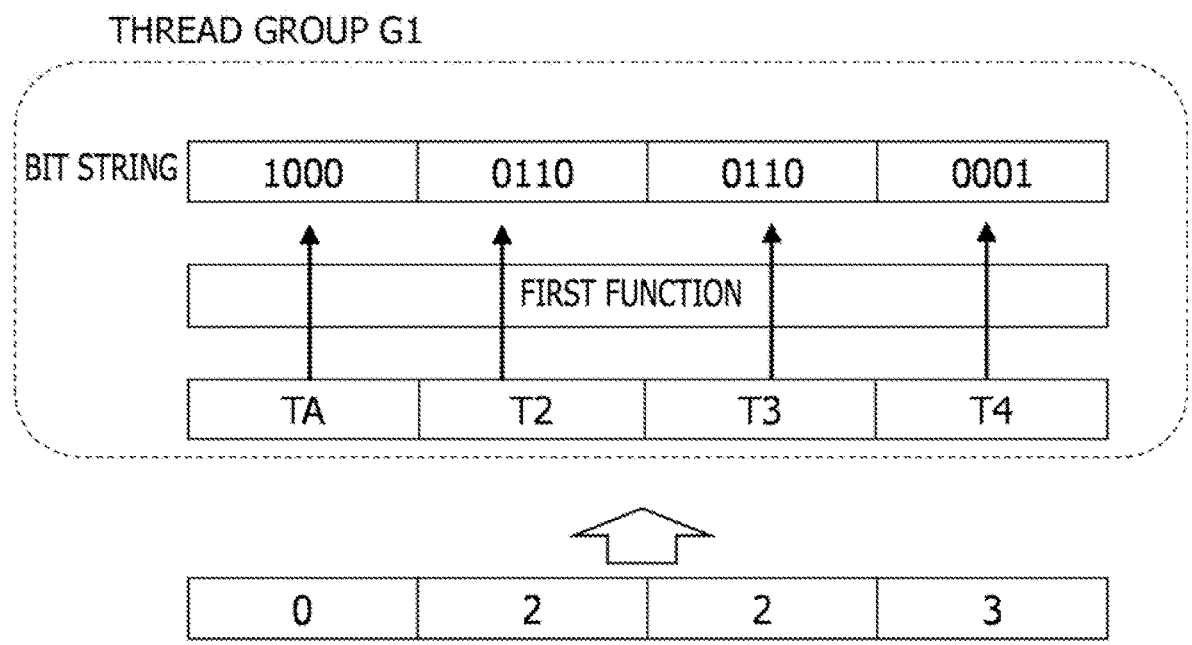
FIG. 9 illustrates an example of processing S200-1 and processing S200-2.

FIG. 9 illustrates an example of processing S200-1 and processing S200-2. The first function uses, for example, a match function that is a comparison function. The match function is a function in which, for example, when a data column and an index value are input, a bit string in which the presence position of the index value in the data column is set to 1 is output. In FIG. 9, the processing for the data group in the second row of the thread group G1 will be described as an example.

As illustrated in FIG. 9, the thread group G1 acquires a data group "0 2 2 3" in the second row. The thread T1 executes the first function to generate a bit string in which "0" of the responsible data of the own thread indicates the presence position in the same data group. Since "0" of the responsible data of the thread T1 is present only at the leftmost position of "0 2 2 3", the generated bit string is "1000".

The threads T2 to T4 also perform the same processing as the thread T1. Since "2" of the responsible data of the thread T2 and the thread T3 is present at the second and third positions from the left of "0 2 2 3", the generated bit string is "0110". Since "3" of the responsible data of the thread T4 is present only at the rightmost position of "0 2 2", the generated bit string is "000".

Returning back to the processing flowchart of FIG. 8, each thread executes the second function to acquire the bit position where 1 (ON) appears first in the bit string (S200-3).

Figure 10:
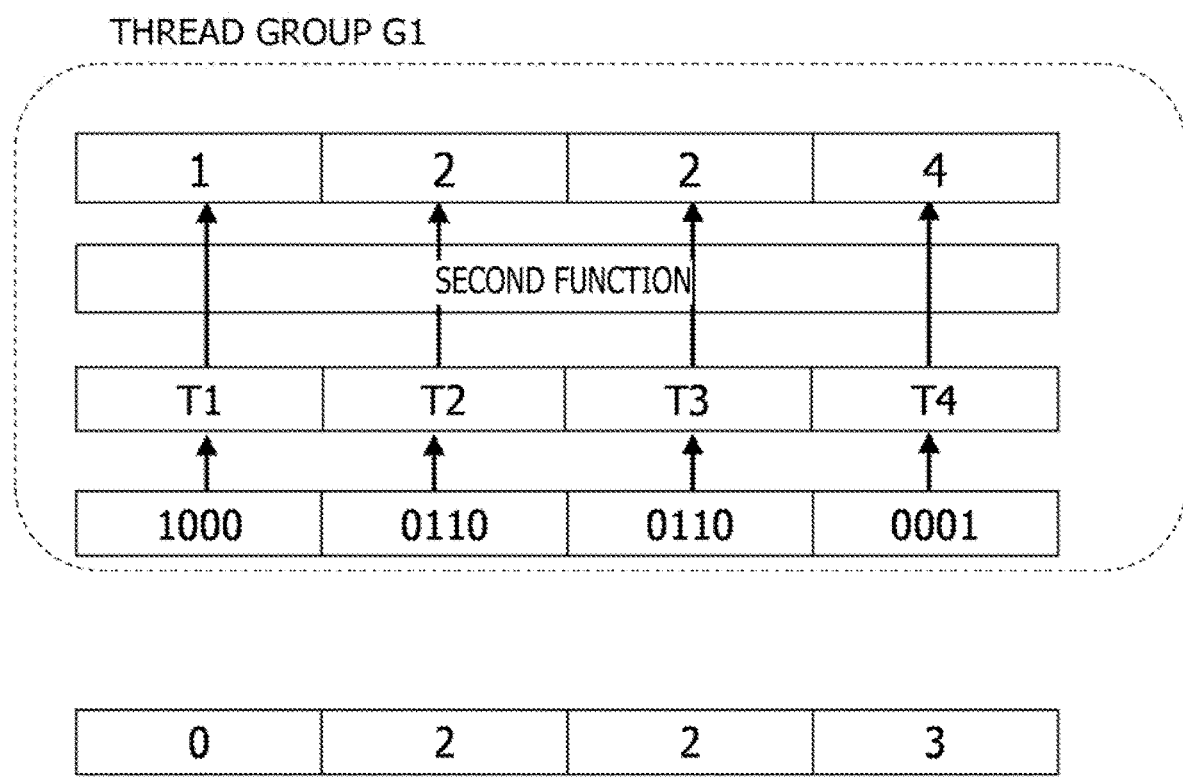
FIG. 10 illustrates an example of processing S200-3.

FIG. 10 illustrates an example of processing S200-3. The threads T1 to T4 execute the second function on the bit string generated by the own thread to acquire the bit position where 1 appears first in the bit string. The second function is, for example, the ffs (ffsll) function. The ffs function is a function in which, for example, when a data column is input, a position where 1 appears first (or last) in the input data column is output. The bit positions are 1 to 4 from the left.

Since the leftmost bit (first bit) is 1, the thread T1 acquires the bit position "1". Similarly, the thread T2 acquires the bit position "2", the thread T3 acquires the bit position "2", and the thread T4 acquires the bit position "4".

Referring back to the processing flowchart of FIG. 8, each thread checks whether or not the numerical value of the responsible data appears first in the data group based on the execution result of the second function (S200-4). For example, it is determined whether or not the own thread is the representative thread that performs addition processing of the local appearance frequency.

Figure 11:
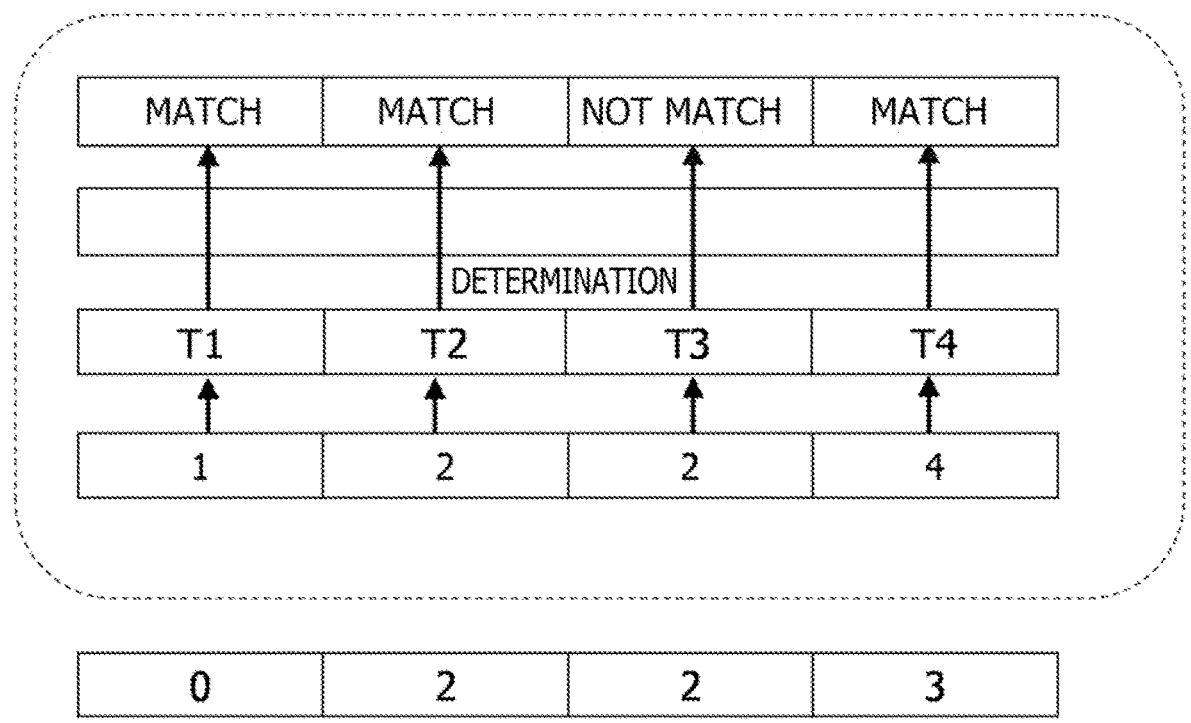
FIG. 11 illustrates an example of processing S200-4.

FIG. 11 illustrates an example of processing S200-4. Each thread checks whether or not the numerical value of the responsible data appears first in the data group. The thread has, for example, an identification number in the thread group. For example, the identification number of the thread T1 is 1, the identification number of the thread T2 is 2, the identification number of the thread T3 is 3, and the identification number of the thread T4 is 4. The identification number is, for example, an identifier corresponding to the position (number from the left in the data group) of the data for which the own thread is responsible. In a case where the identification number of the own thread and the bit position acquired in the processing 200-3 match each other, each thread determines that the numerical value of the responsible data appears first in the data group. For the thread T1, the identification number and the acquired bit position are "1" and match each other. For the thread T2, the identification number and the acquired bit position are "2" and match each other. For the thread T4, the identification number and the acquired bit position are "4" and match each other. The threads T1, T2, and T4 determine that the own thread is the representative thread.

For the thread T3, although the identification number is "3", the acquired bit position is "2", so that the identification number and the bit position do not match each other. For example, the thread T3 is not the representative thread in the processing for the data group.

Referring back to the processing flowchart of FIG. 8, in a case where the numerical value of the responsible data appears first in the data group (the own thread is the representative thread) (Yes in S200-4), each thread executes the third function to acquire the number (duplication number) of times that the numerical value of the responsible data of the own thread is duplicated in the data group (S200-5).

Figure 12:
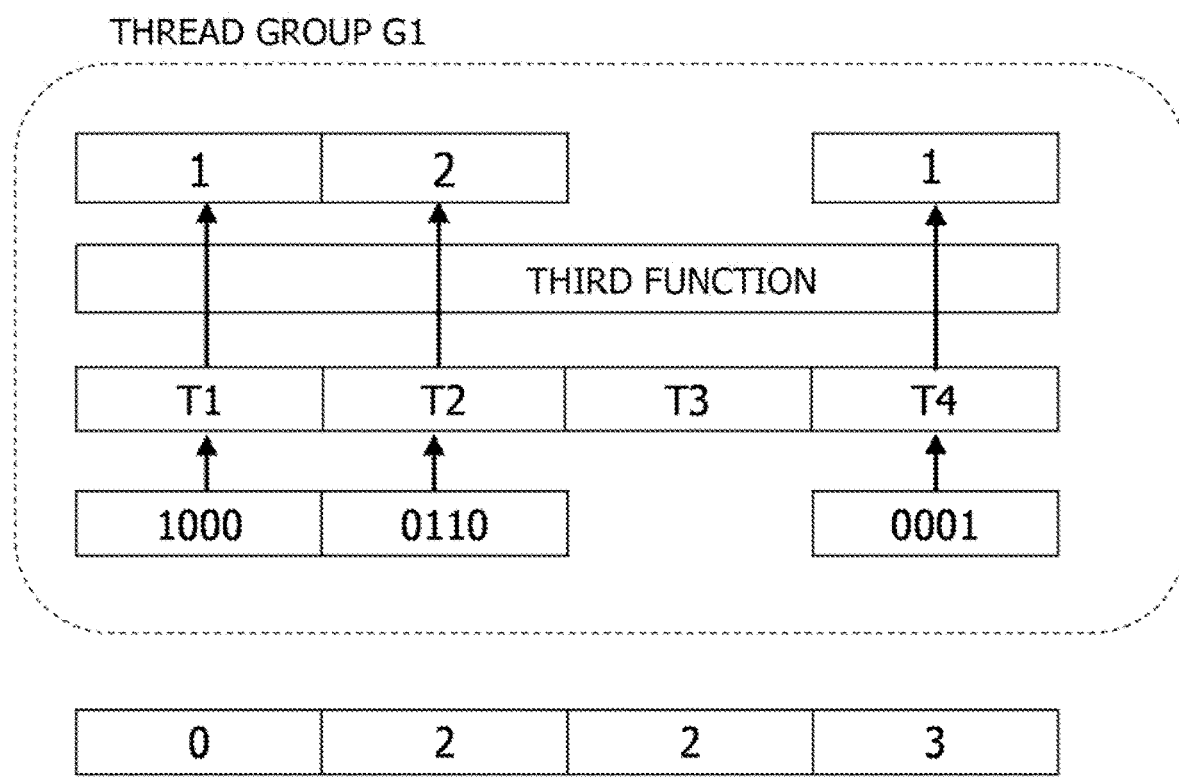
FIG. 12 illustrates an example of processing S200-5.

FIG. 12 illustrates an example of processing S200-5. The third function is, for example, the popc (popcll) function. The popc function is a function in which, for example, when a data column is input, the number of 1 (ON) in the data column is output.

The thread T1, the thread T2, and the thread T4, which are the representative threads, execute the processing S200-5. On the other hand, the thread T3 in which the identification number and the bit position do not match each other in the processing S200-4 does not execute the processing S200-5.

The thread T1 executes the third function to calculate the number (duplication number) of is in the bit string. The thread T1 calculates the duplication number "1". Similarly, the thread T2 calculates the duplication number "2", and the thread T4 calculates the duplication number "1".

Referring back to the processing flowchart of FIG. 8, each thread (representative thread) adds the duplication number to the area corresponding to the numerical value of the responsible data in the storage area of the local appearance frequency of the own thread group (S200-6).

On the other hand, in a case where the numerical value of the responsible data does not appear first in the data group (No in S200-4), each thread does not execute the processing S200-5 and the processing S200-6.

Figure 13:
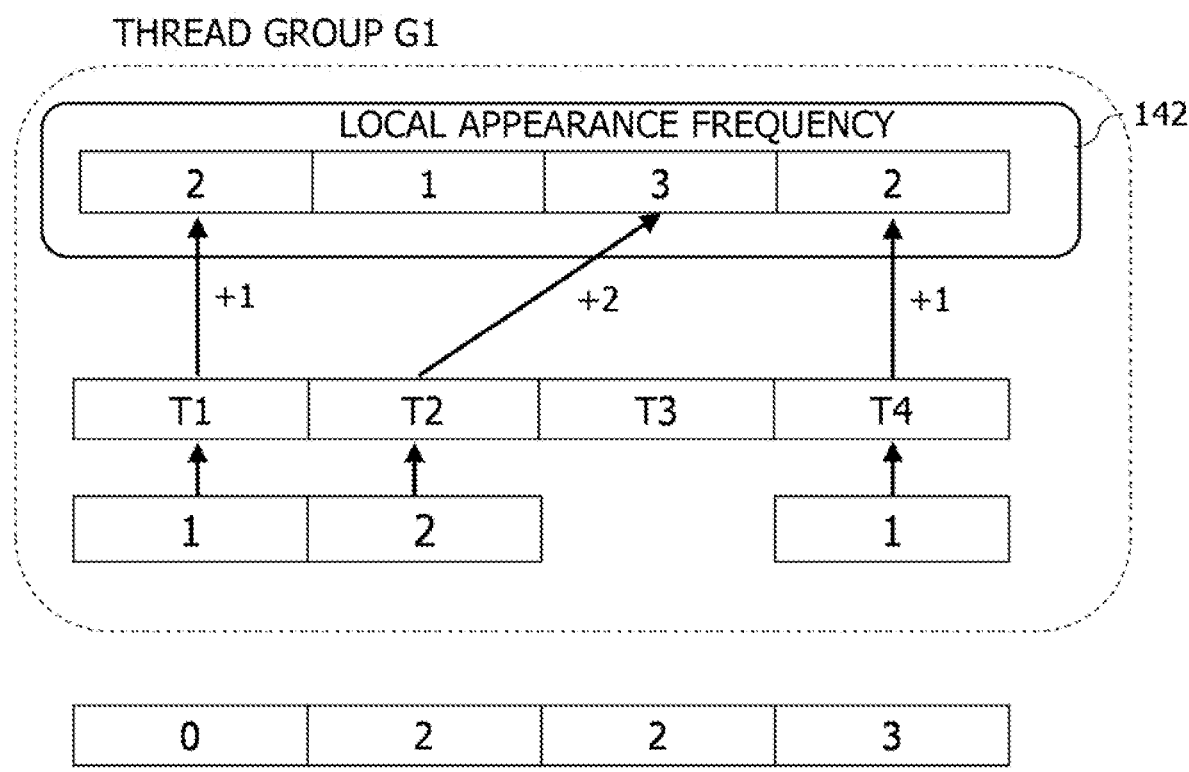
FIG. 13 illustrates an example of processing S200-6.

FIG. 13 illustrates an example of the processing S200-6. The thread T1, the thread T2, and the thread T4, in each of which the identification number and the bit position match each other in the processing S200-4, execute the processing S200-6. On the other hand, the thread T3 in which the identification number and the bit position do not match each other in the processing S200-4 does not execute the processing S200-6.

The thread T1 adds the duplication number "1" calculated in the processing S200-5 to a place corresponding to "0" of the storage area of the local appearance frequency. Similarly, the thread T4 adds the duplication number "1" calculated in the processing S200-5 to a place corresponding to "3" of the storage area of the local appearance frequency.

On the other hand, the thread T2 adds the duplication number "2" calculated in the processing S200-5 to a place corresponding to "2" of the storage area of the local appearance frequency.

Referring back to the processing flowchart of FIG. 8, the thread group checks whether or not the responsible data group of the own thread group is the last data group (S200-7). In a case where the data group is the last data group (Yes in S200-7), the thread group adds the local appearance frequency of the own thread group to the entire appearance frequency (appearance frequency area of the memory 130), and ends the processing (S200-8). The processing S200-8 is, for example, similar to the processing S100-4 (FIG. 7) in the first method appearance frequency calculation processing S100.

In a case where the responsible data group of the own thread group is not the last data group (No in S200-7), the thread group repeats the processing S200-1 to the processing S200-6 until there is no more responsible data.

The processing in which each thread adds the local appearance frequency in FIG. 13 and the processing in which each thread group adds the local appearance frequency to the appearance frequency of the memory 130 in FIG. 7 are the atomic processing.

In the second method appearance frequency calculation processing, in a case where pieces of data having the same value are duplicated in the same data group, only the representative thread performs the addition processing of the local appearance frequency, and therefore the information processing apparatus 100 may suppress the number of times of the atomic processing for adding the local appearance frequency.

The clz (clzll) function may be used as the second function. For example, when a data column is input, the clz function outputs the number of 0s which are present consecutively from the beginning (or the end) of the data column. Since it is seen that 1 appears at the next position of the output number, an output similar to that of the ffs function may be obtained.

Method Determination Processing

The information processing apparatus 100 processes the input data by using the first method appearance frequency calculation processing or the second method appearance frequency calculation processing. In data processing S300, the information processing apparatus 100 selects the first method appearance frequency calculation processing or the second method appearance frequency calculation processing according to the input data.

In order to increase the processing speed, the information processing apparatus 100 selects, for example, the second method appearance frequency calculation processing in which the number of times the atomic processing is performed is small. For example, when the first method appearance frequency calculation processing and the second method appearance frequency calculation processing are performed on the input data having no duplicated numerical value, in a case where the appearance frequency is calculated faster in the second method appearance frequency calculation processing, the information processing apparatus 100 may normally select the second method appearance frequency calculation processing.

Figure 14:
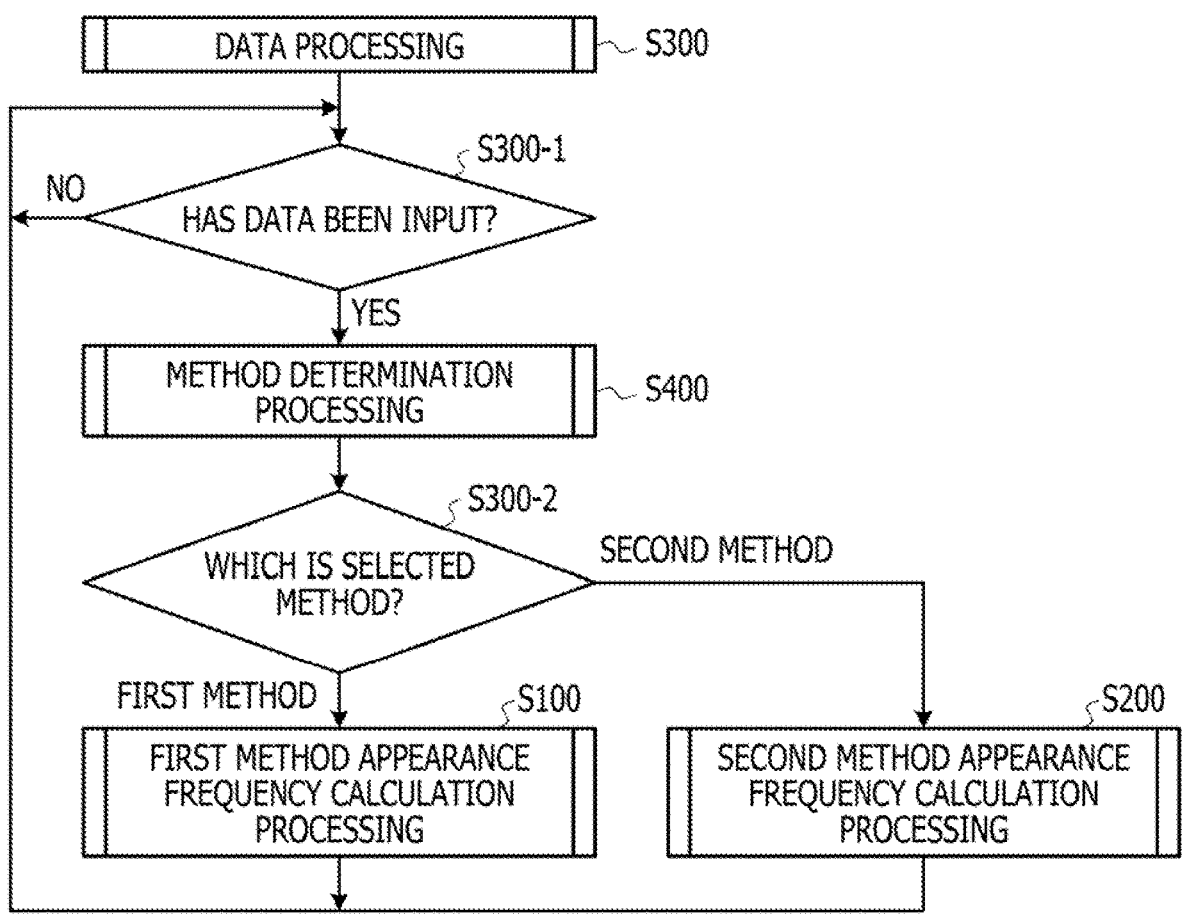
FIG. 14 illustrates an example of a processing flowchart of data processing S300.

FIG. 14 illustrates an example of a processing flowchart of the data processing S300. In the data processing S300, the information processing apparatus 100 waits for the input of the data (No in S300-1).

When the data is input (Yes in S300-1), the information processing apparatus 100 performs method determination processing (S400). The method determination processing S400 is processing of selecting a method in accordance with the input data.

In a case where the selected method is the first method (first method in S300-2), the information processing apparatus 100 executes the first method appearance frequency calculation processing S100, and proceeds to the waiting for the input data again (S300-1).

In a case where the selected method is the second method (second method in S300-2), the information processing apparatus 100 executes the second method appearance frequency calculation processing S200, and proceeds to the waiting for the input data again (S300-1).

1. Method Determination Based on Data Type

Figure 15:
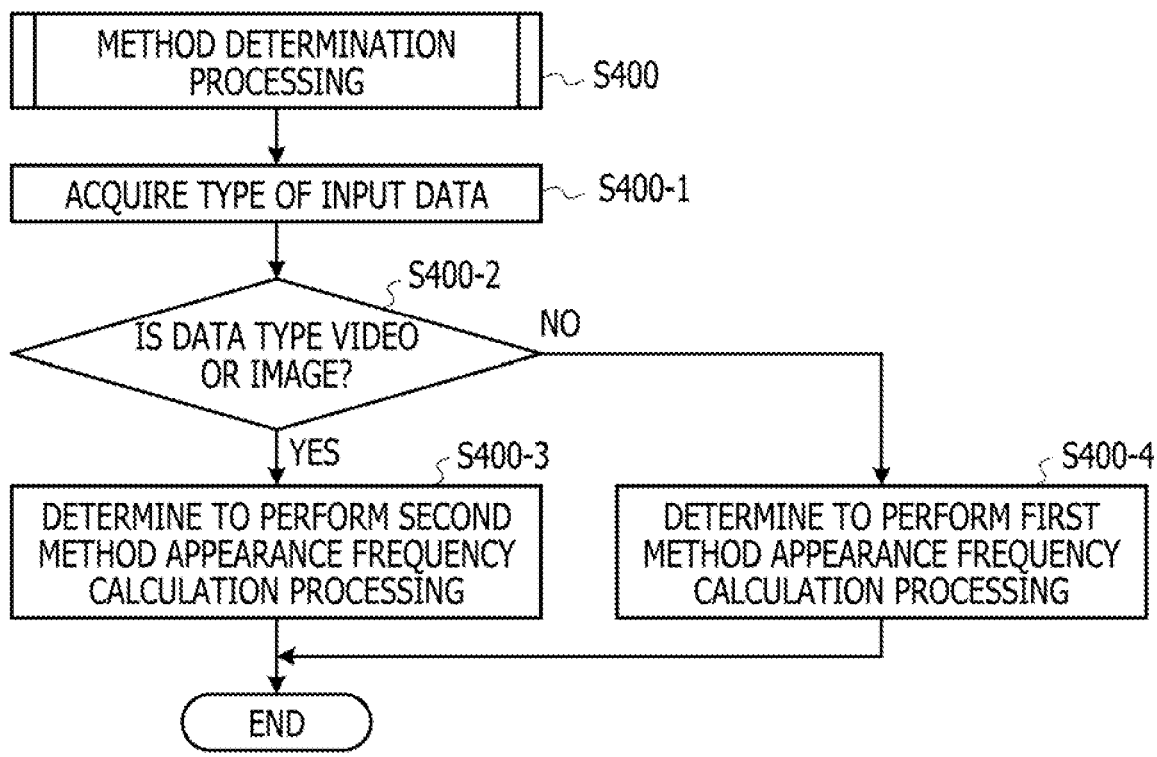
FIG. 15 illustrates an example of a processing flowchart of method determination processing S400.

FIG. 15 illustrates an example of a processing flowchart of the method determination processing S400. The information processing apparatus 100 acquires the type of the input data (S400-1). In a case where the data type is an image or a video (Yes in S400-2), the information processing apparatus 100 determines to perform the second method appearance frequency calculation processing (S400-3), and ends the processing.

In a case where the data type is not an image or a video (No in S400-2), the information processing apparatus 100 determines to perform the first method appearance frequency calculation processing (S400-4), and ends the processing.

In the image or video data, generally, adjacent pixels have the same color, for example, data having the same value in many cases. For example, since it may be assumed that the image or video data includes many pieces of data having the same value, the number of times of performing the atomic processing may be suppressed by executing the second method appearance frequency calculation processing, and the processing speed may be increased.

2. Method Determination Based on Number of Elements

Figure 16:
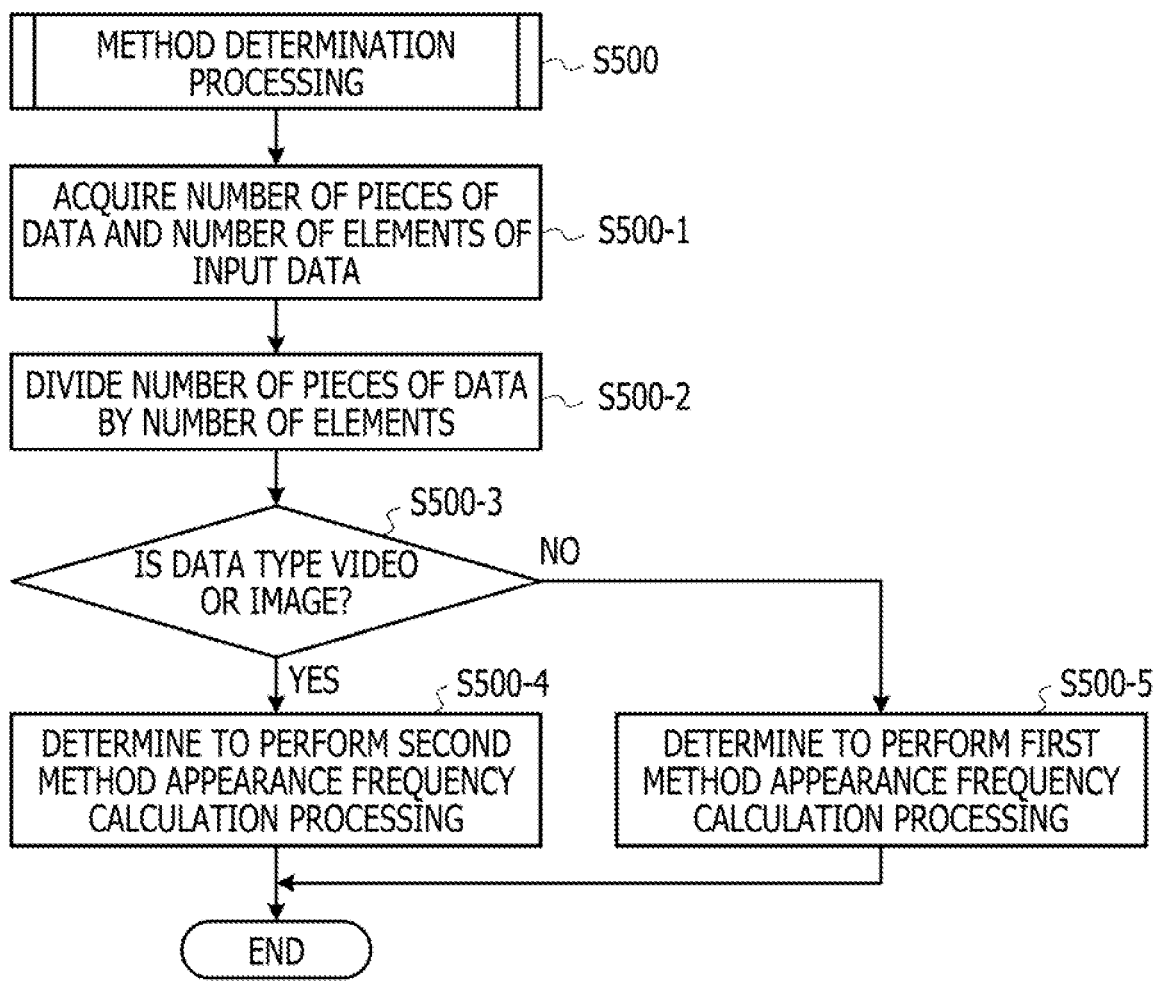
FIG. 16 illustrates an example of a processing flowchart of the method determination processing S400.

FIG. 16 illustrates an example of a processing flowchart of the method determination processing S500. The information processing apparatus 100 acquires the number of pieces of data and the number of elements (number of types of the value of the data) of the input data (S500-1). The information processing apparatus 100 divides the number of pieces of data by the number of elements (S500-2).

In a case where the division result is equal to or larger than a threshold (Yes in S500-3), the information processing apparatus 100 determines to perform the second method appearance frequency calculation processing (S500-4), and ends the processing.

In a case where the division result is not equal to or larger than the threshold (No in S500-3), the information processing apparatus 100 determines to perform the first method appearance frequency calculation processing (S500-5), and ends the processing.

The division result indicates an average value of the duplication numbers of the respective numerical values. As the division result is larger, the number of duplicated numerical values in the input data is larger (the possibility of duplication is higher). When the division result is larger than the threshold, the information processing apparatus 100 determines that the processing speed may be increased in the second method appearance frequency calculation processing, and selects the second method appearance frequency calculation processing.

OTHER EMBODIMENTS

For example, the method determination processing S400 or S500 may be executed by the CPU 110 or may be executed by the GPU 140.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an appearance frequency calculation program for causing a graphics processing unit included in an information processing apparatus to execute processing comprising:
    construction processing of constructing one or more thread groups each constituted of a plurality of threads;
    acquisition processing in which the thread group acquires, from input data, a data group including a same number of pieces of data as a number of threads constituting the thread group, each of the plurality of threads of the thread group being responsible for one piece of data of the data group; and
    addition processing in which the thread increments a value in a first storage area that stores an appearance frequency of a first numerical value when the first numerical value of data for which the own thread is responsible is not duplicated in the data group, and a duplication number indicating a number of duplication is added to the first storage area when the own thread is a representative thread that is present alone in the thread group that is responsible for the data of the first numerical value in a case where the first numerical value is duplicated in the data group.

2. The non-transitory computer-readable recording medium according to claim 1, wherein the first storage area is included in a local appearance frequency storage area that stores an appearance frequency of each numerical value for each thread group, and the local appearance frequency storage area is present in a memory included in the graphics processing unit.

3. The non-transitory computer-readable recording medium according to claim 2, wherein the acquisition processing and the addition processing are executed on all of the input data, and the thread group executes total addition processing of adding the appearance frequency stored in the local appearance frequency storage area of the own thread group to a total appearance frequency storage area that stores a total of appearance frequencies of all of the thread groups.

4. The non-transitory computer-readable recording medium according to claim 3, wherein the total appearance frequency storage area is a memory other than the memory included in the graphics processing unit, and is present in a memory included in the information processing apparatus.

5. The non-transitory computer-readable recording medium according to claim 1, wherein in determining whether or not the first numerical value is duplicated in the addition processing, a first function that generates a bit string in which a position where a target numerical value is present in the data group is set to one is used.

6. The non-transitory computer-readable recording medium according to claim 5, wherein the first function includes a match function.

7. The non-transitory computer-readable recording medium according to claim 5, wherein in determining whether or not the thread is the representative thread in the addition processing, a second function that outputs a position where one appears first or last in the bit string is used.

8. The non-transitory computer-readable recording medium according to claim 7, wherein the second function includes a find-first-set (ffs) function.

9. The non-transitory computer-readable recording medium according to claim 7, wherein in calculating the duplication number in the addition processing, a third function that outputs a number of is in the bit string is used.

10. The non-transitory computer-readable recording medium according to claim 9, wherein the third function includes population count (popc) function.

11. The non-transitory computer-readable recording medium according to claim 1, wherein the processing further includes second addition processing in which the thread increments the value in the first storage area regardless of whether or not the first numerical value is duplicated in the data group, in addition to the addition processing, and selection processing of selecting at least one of the addition processing or the second addition processing according to the input data is executed.

12. The non-transitory computer-readable recording medium according to claim 11, wherein in a case where the input data is image data, the addition processing is executed.

13. The non-transitory computer-readable recording medium according to claim 12, wherein an image of the image data includes a still image and a video.

14. The non-transitory computer-readable recording medium according to claim 11, wherein in a case where an average duplication number of respective numerical values in the input data is equal to or larger than a threshold, the addition processing is executed.

15. The non-transitory computer-readable recording medium according to claim 14, wherein the average duplication number is calculated by dividing a number of pieces of data of the input data by a number of elements of the input data.

16. The non-transitory computer readable recording medium according to claim 11, wherein a processor included in the information processing apparatus other than the graphics processing unit executes the selection processing.

17. An information processing apparatus comprising:
a memory; and
a processor coupled to the memory and configured to:
 construct one or more thread groups each constituted of a plurality of threads;
 acquire, from input data, a data group including a same number of pieces of data as a number of threads constituting the thread group;
 set, to each of the plurality of threads of the thread group, one piece of data of the data group;
 increment a value in a first memory area that stores an appearance frequency of a first numerical value when the first numerical value of data for which the own thread is responsible is not duplicated in the data group; and
 add a duplication number indicating a number of duplication to the first memory area when the own thread is a representative thread that is present alone in the thread group that is responsible for the data of the first numerical value in a case where the first numerical value is duplicated in the data group.

18. An appearance frequency calculation method comprising:
 constructing, by a computer, one or more thread groups each constituted of a plurality of threads; acquiring, from input data, a data group including a same number of pieces of data as a number of threads constituting the thread group;
 setting, to each of the plurality of threads of the thread group, one piece of data of the data group;
 incrementing a value in a first memory area that stores an appearance frequency of a first numerical value when the first numerical value of data for which the own thread is responsible is not duplicated in the data group; and
 adding a duplication number indicating a number of duplication to the first memory area when the own thread is a representative thread that is present alone in the thread group that is responsible for the data of the first numerical value in a case where the first numerical value is duplicated in the data group.

* * * * *